United States Patent [19]

Blackmore, Jr.

[11] 4,197,674
[45] Apr. 15, 1980

[54] PLANT CONTAINER

[76] Inventor: Fred N. Blackmore, Jr., 3627 Elizabeth Rd., Ann Arbor, Mich. 48103

[21] Appl. No.: 916,260

[22] Filed: Jun. 16, 1978

[51] Int. Cl.² ............................................. A01G 9/10
[52] U.S. Cl. ........................................... 47/73; 47/87
[58] Field of Search .................. 47/73, 74, 75, 76, 77, 47/78, 85, 86, 87, 84

[56] References Cited
U.S. PATENT DOCUMENTS

| | | | |
|---|---|---|---|
| 3,483,908 | 12/1969 | Donovan | 47/73 X |
| 3,903,643 | 9/1974 | Blackmore | 47/77 |
| 3,931,694 | 1/1976 | Krikorian | 47/87 |

FOREIGN PATENT DOCUMENTS 1179807  2/1970  United Kingdom ..................... 47/87

*Primary Examiner*—Edgar S. Burr
*Assistant Examiner*—James R. Feyrer
*Attorney, Agent, or Firm*—Olsen and Stephenson

[57] ABSTRACT

A plant container having a plurality of downwardly extending compartments, each retaining a dirt ball having the root structure of a growing plant. Each compartment has an open top end and side walls converging downwardly and terminating at the bottom end of the compartment. The bottom end of the compartment is constructed of thin material and is slitted to form yieldable flap members that can bend reverse inwardly on themselves so that an ejecting plunger can be moved upwardly through the bottom of the compartment to eject the dirt ball without damaging its structural integrity.

1 Claim, 4 Drawing Figures

PLANT CONTAINER

BACKGROUND OF THE INVENTION

The present invention relates generally to a seedling flat, and more particularly, to a plant container constructed to facilitate the removal of growing plants therefrom. Although many types of seedling flats have been developed over the years, a problem that continually plagues the plant growing industry concerns the difficulty of removing a plant from its growing compartment in a high production setting without damaging the dirt ball and root structure of the plant. This problem has been addressed by providing seedling flats, in some instances, with knock out bottom walls that are pushed upwardly to remove the plants from the compartments. A force large enough to knock out the bottom wall may cause the bottom wall to impact against the dirt ball causing it to disintegrate. Further, a bottom wall that is removable from the plant container must be manually separated from the dirt ball and becomes extra litter that must be disposed of thereby causing additional handling costs.

In applicant's prior U.S. Pat. No. 3,903,643, a germinating tray is disclosed having a plurality of growing compartments, each consisting of upright sidewalls and a slitted bottom wall. The plant and soil retained in each compartment can be ejected downwardly through the bottom wall and into a soil bed by the downward movement of a plunger through the compartment. The downward ejection of the plants is feasible since the plant itself is small and a plunger can be provided having a relatively large cross-sectional area and configured so that it will not damage the plant.

However, different considerations are involved when the plant has attained a more advanced state of development. Since the plant is larger, it is impractical to push it downwardly through the container because of the increased likelihood of damage to the plant by the plunger. Also with a larger container there is more surface area in each compartment to which the soil can stick thereby increasing the chances that the dirt ball will disintegrate when it is ejected from the compartment. If the plant is removed by manually grasping the plant above the soil, destruction of the entire plant is probable.

It is therefore the object of the present invention to provide a plant container that facilitates the removal of the plant and soil therefrom.

It is another object of this invention to provide a plant container which enables the ejection of the plant and soil by the upward movement of an ejector through the bottom of the container.

SUMMARY OF THE INVENTION

In accordance with the present invention, a plant container is provided consisting of a main body member having a plurality of downwardly extending compartments in which plants and growing media are contained. Typically, the growing media consists of soil having the proper nutrients and forming a dirt ball in which the root structure of a plant grows. Each compartment has an open top end and downwardly converging curved side walls that terminate at the bottom of the compartment. The portions of the side wall adjacent the bottom of the compartment are constructed of thin-gauge, flexible material such as plastic or other suitable material. The bottom of the compartment is slitted to form flap members extending radially outwardly from the central point in the bottom of the containers. The flap members bend inwardly upon themselves in response to an upwardly movement of an ejector plunger to admit the plunger into the compartment through the bottom of the compartment to eject the plant and dirt ball from the compartment without damaging the structural integrity of the dirt ball. The curved side walls which converge downwardly toward each other facilitate the removal of the dirt ball and plant because contact between the dirt ball and the inner surface of the compartment is quickly broken by virtue of the converging side wall configuration. The flap members thus perform the dual function of retaining soil in the compartment and reverse bend upon themselves to enable an ejector plunger to be moved upwardly through the bottom of the container to eject the plant and dirt ball therein.

Further objects, features and advantages of the present invention will become apparent from a consideration of the following description when taken in connection with the appended claims and the accompanying drawing in which:

Figure 1:
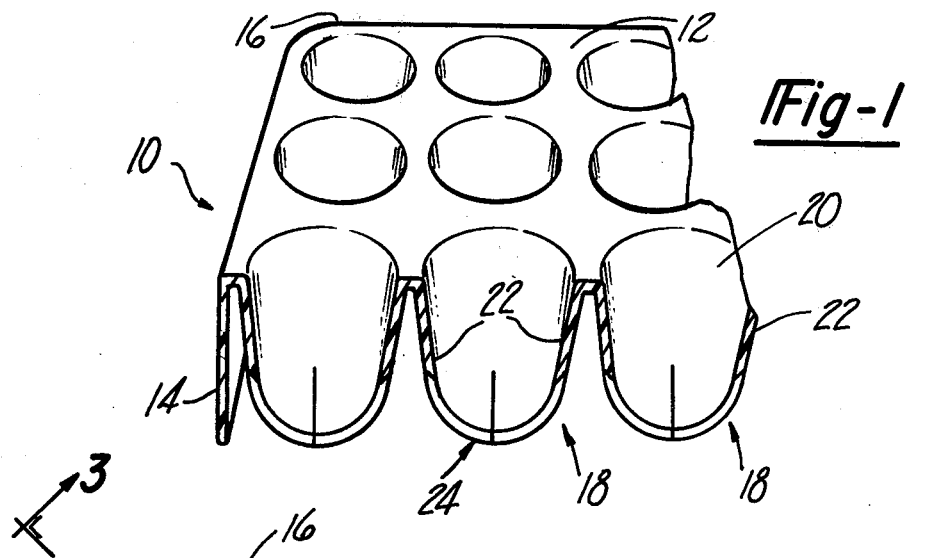
FIG. 1 is a fragmentary perspective view, taken in section, of the plant container of the present invention.
Figure 2:
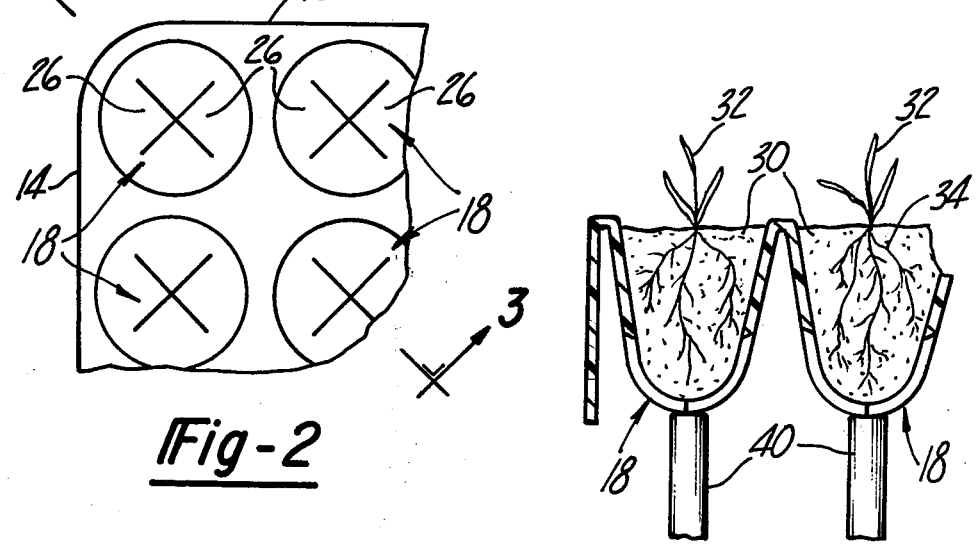
FIG. 2 is a plan view of a portion of the plant container shown in FIG. 1.

Referring to the drawing, the plant container of the present invention, indicated generally at 10 in FIG. 1, is particularly suited for germinating and growing plants during their initial stages of development. The plant container 10 consists of a main body member 12 having downwardly extending side walls 14 and end walls 16. A plurality of downwardly extending compartments 18 are arranged on the body member 12 in a suitable array. Each compartment 18 has an open top end 20 and downwardly converging curved side walls 22 which terminate at the bottom end 24 of each compartment 18. The bottom end 24 is slit forming a plurality of yieldable flap members 26 which extend radially outwardly from the center of the bottom end 24. The flap members 26 function to retain the soil in the compartment 18. As used herein, the term "side walls" is inclusive of side walls formed by a cylindrical or similarly curved compartment wherein the termination of one side wall and the beginning of an adjacent side wall is indistinguishable, as well as side walls that are readily distinguishable from each other.

The side walls 22 in the illustrated embodiment are formed of thin-gauge resilient material so that the flap members 26 in the bottom end 24 of the compartment can be bent inwardly upon themselves. As shown in the FIGURES, the flap members 26 are formed to a generally V-shaped configuration by the criss-cross slits.

Figure 3:
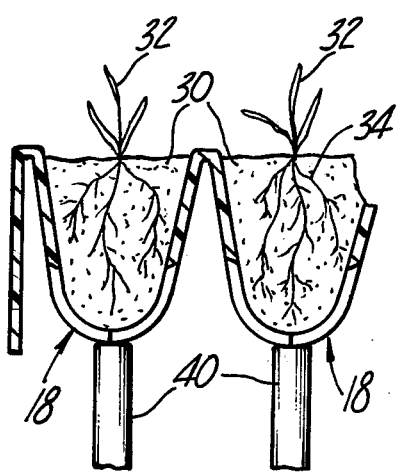
FIG. 3 is a sectional view of the plant container taken substantially from lines 3—3 in FIG. 2 showing a plant and growing media contained in the compartments with ejecting plungers shown positioned below the compartments.
Figure 4:
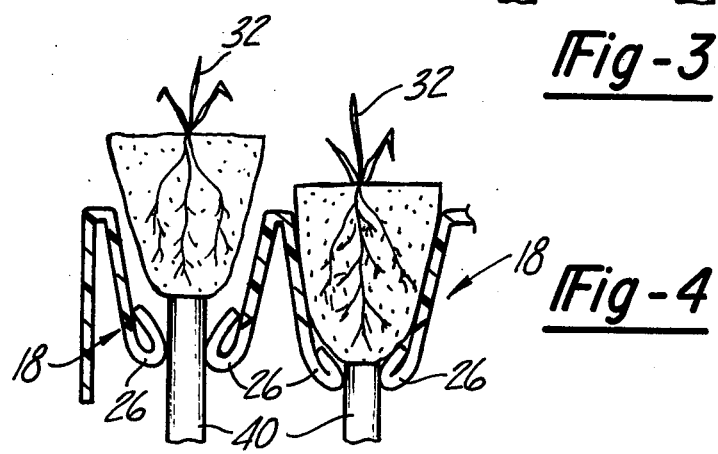
FIG. 4 is a sectional view like FIG. 3, but showing the ejecting plungers in positions ejecting the plants and dirt balls.

With reference to FIGS. 3 and 4, the plant container 10 has each of its compartments 18 filled with a suitable growing media such as soil 30. A seed (not shown) is planted in the soil 30 and a plant 32 having a root structure 34 grows in each container 18.

The construction of each compartment 18 with its converging side walls 22 enables the ready removal of the dirt ball and root structure from the compartment 18 without damaging the structural integrity of the dirt ball and root structure since upon upward movement of the dirt ball, it immediately breaks contact with the side walls 22. The ejection of the dirt balls is facilitated by virtue of the thin wall flap members 26. As seen in FIGS. 3 and 4, ejector plungers 40 are aligned with the center of the bottom ends 24 of the compartments 18. Movement upwardly of the ejector plungers 40 into the compartments 18 causes the flap members 26 to reverse bend upon themselves to admit the plungers 40 into the compartments 18. The plungers 40 engage the dirt balls and push them upwardly through the open top end 20 of the compartments 18. The dirt balls and plants are therefore ejected without damage to the structural integrity of the dirt balls. The plants remain healthy with an increased chance of survival after being replanted.

From the above description, it can be seen that an improved plant container is provided with downwardly converging sidewalls 22 which enable the ready removal of a plant and dirt ball from each individual compartment in response to the upward movement of an ejector plunger through the bottom of the compartment. Since the flap members 26 are permanently affixed to the compartment 18, no additional litter is created when a plant is ejected from a compartment thereby reducing handling costs.

What is claimed:

1. A plant container comprising a body member having a plurality of downward extending compartments, each compartment having an open top end and being adapted to contain a dirt ball having the root structure for a growing plant contained therein, downwardly converging curved side walls terminating at a rounded bottom end of each compartment, at least a portion of said side walls being generally upright above said rounded bottom end, the bottom end of each compartment being formed of thin yieldable material and having criss-crossed slits formed therethrough extending upwardly from said bottom end and into said upright portion of said curved side walls, said slits defining and giving yieldability to a plurality of upwardly and inwardly bendable V-shaped flap members having end portions located essentially at the center of said rounded bottom end and sides diverging radially outwardly and upwardly therefrom so that said flap members curve upwardly from said center location of said bottom end, at least a portion of each of said flap members being generally upright in general alignment with said upright side walls, the thin yieldable and curved construction of said flap members enabling the reverse inward bending of said flap members on themselves establishing an opening when an ejecting plunger is moved upwardly through said bottom end to eject the dirt ball and root structure therein without damaging the structural integrity thereof.

* * * * *